United States Patent [19]
Lehnhardt et al.

[11]  4,349,576
[45]  Sep. 14, 1982

[54] SOY ISOLATE IN MELTABLE IMITATION CHEESE

[75] Inventors: William F. Lehnhardt; Charles E. Streaty, Jr., both of Decatur; Walter C. Yackel, Jr., Oreana; Ho S. Yang; Daniel K. Tang, both of Decatur, all of Ill.

[73] Assignee: A. E. Staley Manufacturing Company, Decatur, Ill.

[21] Appl. No.: 220,680

[22] Filed: Dec. 29, 1980

[51] Int. Cl.$^3$ .................... A23C 19/055; A23C 20/00
[52] U.S. Cl. .................................. 426/582; 426/656; 260/123.5
[58] Field of Search .................... 426/582, 656, 657; 260/123.5

[56] References Cited

U.S. PATENT DOCUMENTS

| | | | |
|---|---|---|---|
| 2,495,706 | 1/1950 | DeVoss et al. | 426/656 X |
| 2,561,333 | 7/1951 | Beckel et al. | 426/656 X |
| 2,881,076 | 4/1959 | Sair | 260/123.5 UX |
| 3,001,875 | 9/1961 | Sair | 260/123.5 UX |
| 3,218,307 | 11/1965 | Eldridge | 426/656 X |
| 3,630,753 | 12/1971 | Melnychyn | 426/656 |
| 3,734,901 | 5/1973 | Hayes et al. | 260/123.5 |
| 3,741,771 | 6/1973 | Pour-El et al. | 426/656 X |
| 3,743,516 | 7/1973 | Lundstedt et al. | 426/582 X |
| 3,870,801 | 3/1975 | Tombs | 426/656 X |
| 3,870,812 | 3/1975 | Hayes et al. | 426/573 X |
| 3,878,232 | 4/1975 | Hayes et al. | 260/412.4 |
| 3,891,777 | 6/1975 | Boyer | 426/656 X |
| 3,891,778 | 6/1975 | Boyer | 426/656 X |
| 4,080,477 | 3/1978 | Tsumura et al. | 426/656 |
| 4,188,399 | 2/1980 | Shemer | 426/656 X |
| 4,234,620 | 11/1980 | Howard et al. | 260/123.5 X |

FOREIGN PATENT DOCUMENTS 1377392 12/1974 United Kingdom .

OTHER PUBLICATIONS

Morr, Technical Problems and Opportunities in Using Vegetable Proteins in Dairy Products, J. Amer. Oil Chem. Soc., Mar. 1979, p. 383.
Bozzi, Cheese Analog Advantages Range Beyond Economical Aspects, Food Product Development, Jun. 1980, pp. 42, 44.
Puski, Cereal Chem. 52, 655–664 (1957).
Circle et al., Cereal Chem., 41:157–172 (1964).
Catsimpoolas et al., Cereal Chem. 47:559–570 (1970).
Briggs et al., Arch. Biochem. & Biophys. 72:127–144 (1975).
Nash et al., Cereal Chem. 44:183–192 (1967).
Wolf, J. Agr. & Food Chem., vol. 18, No. 6, pp. 969–976 (1970).
Nillsen, J. Amer. Oil Chem. Soc. 37:217–219 (1960).
Wolf et al., Arch. Biochem. & Phy. 99, 265–274 (1962).
Bradford, Anal. Biochem. 72, 248–254 (1976).
Altschul, Processed Plant Protein Foodstuffs, Academic Press: New York, 1958, pp. 399–409.
Markley, Soybeans and Soybean Products, vol. II, 1951, Interscience Publishers: New York, pp. 985–986.

Primary Examiner—Joseph M. Golian
Attorney, Agent, or Firm—M. Paul Hendrickson; Charles J. Meyerson

[57] ABSTRACT

Vegetable proteins may be converted into isolates which are useful for preparing imitation cheese products. These unique isolates are characterized in general as: having an NSI of at least 90, having not been subjected to enzymatic or chemical hydrolysis, forming an insoluble gel when reconstituted in water at a 15% by weight protein isolate concentration and heated to 85° C. for 30 minutes, and yielding a melt value of at least 15 cm$^2$. The isolates are prepared under conditions which precondition the protein molecules so that they may be converted, upon heat treatment, into protein aggregates which simulate the hydrocolloidal attributes of caseinate. The heat treatment causes restructuring of the proteinaceous molecules into large molecular weight aggregates. Soy isolates prepared in accordance with this invention may be utilized to replace from about 20% to 60% or higher of the caseinate in an imitation cheese recipe without adversely affecting the melt characteristics of the imitation cheese product.

9 Claims, No Drawings

SOY ISOLATE IN MELTABLE IMITATION CHEESE

BACKGROUND OF THE INVENTION

Within recent years, imitation coffee creamers, milks, whipped toppings, cheese, sour creams, etc. have increasingly been accepted by consumers as a replacement for most costly natural dairy products. Milk proteins are most commonly used in these imitation dairy products because of their exceptional flavor and functional properties. The functional attributes of milk proteins in natural and synthetic cheese products are unique. These unique functional attributes play not only a vital role in the finished imitation cheese products, but also in their preparation.

The art has desired to replace milk protein with vegetable proteins. Unfortunately vegetable proteins do not possess the necessary prerequisital properties to function as a caseinate replacement in imitation dairy products. Vegetable proteins would be a highly desirable imitation cheese component, provided an economical and effective means for simulating the unique efficacy of casein could be found.

Vegetable proteins (including soy) are sensitive to a wide variety of conventional food processing and recipe conditions which do not normally affect milk proteins. Relatively mild physical processing conditions such as heating, drying, moisture level, etc. are known to adversely affect its properties. Factors such as the nature and character of the recipe additives, concentrations, ionic strength, pH, temperature, recipe preparation, affect these interreactions and functional properties. Vegetable protein molecules undergo complex association, disassociation and chemical reactions with one another as well as other molecules which may be present in any given system. To compensate for such functional deficiencies supplemental non-dairy additives such as food stabilizers, gums, etc. are typically required to correct the functional deficiencies of such vegetable proteins. Such additives often result in more costly imitation products of an inferior quality. Consequently, vegetable protein isolates are usually relied upon primarily as a nutritional protein source in such imitation products instead of a functional component.

An article by C. V. Morr (Jr. of Amer. Oil Chem. Soc., March 1979, page 383) reports that the functional and chemical properties of vegetable proteins are complex. Sedimentation by centrifugation studies are conventionally used to identify the different indigenous types of soy proteins. The centrifugal sediments are commonly referred to as the 2S, 7S, 11S and 15S fractions, which respectively corresponds to peak molecular weights of approximately 25,000; 160,000; 350,000 and 600,000. As illustrative native soybean seed analysis (on a weight basis) will typically yield approximately 7% 2S, 34% 7S, 42% 11S and 9% 15S. The major soy protein components are the 7S and 11S fractions. Factors such as seed type, climatic, growing and isolate processing conditions can alter the molecular weight distribution and the relative proportions of these protein fractions. The larger molecular weight fractions are comprised of a plurality of subunits which are known to undergo ionic association and disassociation. This contributes to the quaternary structure and complexity of the soy proteins when used in aqueous systems. These subunit interreactions significantly contribute or interfere with the functionality of the soy properties in food recipes.

Amongst all of the possible food applications, the prerequisital properties needed to produce a satisfactory imitation cheese product places demanding constraints upon the type of proteins which may be used. Cheese analogs or imitation cheeses typically contain hydrogenated vegetable oils as a fat source and essentially rely upon milk caseinates as the functional protein component. The melt, compatibility with other imitation cheese ingredients, tolerance to recipe conditions, water-absorption, solubility, emulsifying, low viscosity, etc. properties uniquely distinguish the functional utility of the milk caseinate in imitation cheese products. Attempts to utilize soy isolates as a full or partial replacement for caseinates have not been successful (see "Cheese analog advantages range beyond economical aspects" by Marshall J. Bozzi, Food Product Development, June 1980, pages 42 and 44).

Soy proteins which gel upon heating have been reported. U.S. Pat. No. 3,870,801 by Tombs discloses a mesophase defined as "fluid aqueous composition, capable of being heat-coagulated, containing from 15 to 50% dissolved, undenatured plant protein and sufficient water-soluble salts to keep the protein dissolved and having a pH in the range of about 4 to 6." The mesophase is prepared from high NSI soy flakes by extracting the soluble constitutents at a low temperature in the presence of excess water and with a small amount of sodium sulfite followed by the removal of insoluble carbohydrate material therefrom by centrifugation (pH 4.6–4.9), isolation of the protein from the supernatant and reconstitution of isolate in an aqueous salt solution with special precautions being taken to avoid oxidative disulfide formation. The mesophase is reportedly heat-coagulable at 90° C. and is useful as a protein binder in meat applications.

U.S. Pat. No. 4,188,399 by Shemer also discloses a heat-coagulable viscous soy protein product. According to the Shemer patent, a high NSI soybean flour is subjected to aqueous extraction at a pH 5.1–5.9 in the presence of sodium sulfite at a low extraction temperature to extract soluble proteins and carbohydrates therefrom. The liquid protein is then adjusted to a pH 4.5 with phosphoric acid to provide a viscous fluid containing more than 70% of the 7S fraction. The viscous fluid material of Shemer is disclosed as a heat-coagulable binder for synthetic and natural meat applications.

British Patent Specification No. 1,377,392 discloses a dry, substantially undenatured salt-containing soy protein composition. The soy protein isolate "entails precipitation of the isolate from an aqueous extraction prepared from defatted soy meal in the presence of a water-soluble sulphite, bisulphite, or dithionite salt, preferably an alkali metal (including ammonium) salt . . . ." According to the British patentees, the protein isolate is then reconstituted in an aqueous salt solution to form a liquid composition containing from 0–50% dissolved soy protein and spray-dried to provide a free-flowing, pale cream powder which is reportedly useful in preparing foodstuffs such as soy protein extrudates. The spray-dried powder is described as readily reconstituted in water and set by heat at temperatures ranging from 80°–150° C.

A U.S. Pat. by Melnychyn et al. (3,630,753) discloses a process for producing a freeze-dried soy protein isolate. It is obtained by an alkaline extraction (e.g. pH 8.5) of the protein and water-soluble components in the presence of a specific type of oxidizing or thiol bearing reagents which are capable of reacting with disulfide linkages. The extraction is preferably conducted at about 170° F. which will result in partial hydrolysis of the protein. The crude extract is then clarified by centrifugation, the protein precipitated at pH 4.5 at 100° F. followed by its recovery by centrifugation, washing, redissolving the protein in water at pH 7.0, and freeze-drying to obtain a dry soy protein isolate powder. The isolate is reportedly suitable in formulating liquid foods such as imitation milk and infant feeding formulations.

Additional references reporting upon the gelation properties of soy protein include Puski (Cereal Chem. 52:655–664 (1957)); Circle et al. (Cereal Chem. 41:157–172 (1964)); Catsimpoolas et al. (Cereal Chem. 47:559–570 (1970)); U.S. Pat. Nos. 3,741,771 by Pour-El et al.; 2,561,333 by Beckel et al.; 3,870,812 by Hayes et al. and 2,495,706 by DeVoss et al. Further references disclosing the affect of reducing agents upon protein fractions include Briggs et al. (Archieves of Biochemistry and Biophysics 72:127–144 (1957)); Nash et al. (Cereal Chem. 44:183–192 (1967)) and Wolf (Jr. Agr. Food Chem. 18: No. 6,969–976 (1970)).

Recognizing a long-felt need, the inventors have discovered that vegetable proteins can be effectively converted into an isolate product form which will permit their usage in imitation cheese products. Such unique vegetable proteins may be obtained under preparatory conditions which are believed to restructure the native protein constitutes into this unique, useful application. The present commercially available grades of soy isolate products which have not been subjected to enzymatic or chemical hydrolysis typically have a water solubility ranging between about 20 to about 70 NSI (nitrogen solubility index). Substantially unhydrolyzed soy isolates possessing unique functionality in imitation cheese recipes and an NSI of 100 are now possible. Unlike conventional isolates which inhibit or over extend the melt and flow characteristics of milk caseinates (in imitation cheese formulations) the subject isolates have been found to be compatible and complementary to the melt and flow characteristics of milk caseinates. The water-solubility, bland flavor, ability to form clear, tender, elastic, heat-induced gels (as opposed to brittle, non-elastic or rigid gels), low viscosity, water-absorption, fat emulsification, tolerance to salt and other imitation cheese additives uniquely distinguish these isolates from conventional isolates. The composite properties render these unique vegetable protein isolates useful for applications heretofore deemed impossible with conventional vegetable protein isolates.

DESCRIPTION OF THE INVENTION

According to the present invention there is provided a dry vegetable protein isolate useful for preparing imitation cheese products, said isolate characterized as: (a) having an NSI of at least 90, (b) substantially free from vegetable protein hydrolyzates, (c) forming an insoluble gel when reconstituted in water at a 15% by weight protein isolate concentration and heated to 85° C. for 30 minutes, and (d) yielding a melt value of at least 15 cm$^2$ in an imitation cheese formulation consisting of, on a parts by weight (pbw), 51.24 pbw water, 20 pbw partially hydrogenated cottonseed/soybean oil blend (Wiley melting point 38°–41° C.), 12.5 pbw of the protein isolate, 12.5 pbw sodium caseinate, 2 pbw sodium chloride, 0.98 pbw lactic acid and 0.78 pbw sodium aluminum phosphate.

The NSI (nitrogen solubility index) is a standard test (AOCS BA1165-Official Method) for determining the water solubility of protein products. The dry vegetable isolates of this invention will typically have an NSI of at least 90 with an NSI of at least 95 being most typical. Although enzymatically and/or chemically hydrolyzed vegetable protein products will often approach these high NSI values, conventional unhydrolyzed vegetable protein isolates are generally characterized as having substantially lower NSI values. As shown in the examples, the present invention provides a means for producing 100 NSI vegetable protein isolates essentially free from chemically or enzymatically modified protein hydrolyzate products.

Another conventional technique to increase the NSI or water-solubility of an isolate product is to separate and recover the more water-soluble protein fractions from proteinaceous vegetable materials. Fractionation is expensive and provides an isolate product in which only a portion of the total vegetable protein composition is utilized. Contrary to prior beliefs, is has now been discovered that the indigenous components of vegetable proteins can be effectively converted into a high NSI isolate without subjecting the isolate to enzymatic or chemical hydrolysis or costly fractionation techniques. Differential scanning calorimetry tests (often used to ascertain the degree of transformation or modification of the protein from its native form) reveal that the isolates of Example 1 provide protein constituents more closely related to the native seed material in comparison to conventional vegetable protein isolates.

Another unique characteristic of the present isolates is their thermal gelling properties. When the isolates are reconstituted in water at 15% by weight dry substance basis (d.s.b.) and heated at 85° C. for 30 minutes, they form a gelled mass. This gelled mass physically resembles those obtained by the heat denaturing of egg albumin (e.g. fried or boiled egg whites). Under these heat-setting conditions, the fluid or flowable aqueous isolate solution is converted into a pliable, resilient, thermoset gelled mass which possesses sufficient structural integrity to retain its gelled structure under non-confining conditions (e.g. placing on a flat surface). Similar to hard boiled egg whites or natural cheeses, these gelled isolates may likewise be sliced or grated. The gel strength of these heat-set isolates are typically less than 15.0 mm penetration ($\approx$15% d.s.b. and 20° C.) as determined with a penetrometer (Precision Instrument penetrometer equipped with 30 g Precision Instrument cone depressed for 5 seconds). Gel strength of less than 10.0 mm (e.g. 2 mm–8 mm range) as well as those approximating the 5.0 mm to 7.5 mm penetration range of egg albumin are provided by the present invention.

Isolates which upon reconstitution and heat gelation form clear translucent gels are advantageously provided by this invention. As more fully elaborated upon in the examples, such isolates may be prepared by clarifying the extract (centrifugation, filter press, etc.) so as to remove substantially all of the non-proteinaceous water-insolubles (primarily carbohydrates and fiber) from the extracted protein prior to the protein isolation step.

Another salient attribute of the subject isolates is its ability to be formulated into an imitation cheese product without adversely affecting the melt characteristics of the other functional imitation cheese components, including the caseinates. The test method used to determine the efficacy of any given dry isolate product (including the imitation cheese recipe ingredients and preparation, test apparatus and conditions) is more specifically disclosed in Example 4. The test values (measured in square centimeters) obtained by this test method are referred to herein as "melt value". In general this melt test comprises slicing the imitation cheese into a cylinder measuring 47 mm in diameter and 5.5 mm thick. The slice is then baked in a preheated oven for 7 minutes at 220° C. Isolates which do not interfere with the melt properties of the imitation cheese formulation exhibit melt and flow characteristics similar to the natural cheese products. By measuring the total area increase (in $cm^2$) of the baked slice, the relative effectiveness of the isolate in the imitation cheese product can be determined.

Inefficacious isolates will persistently yield less than 10 $cm^2$ melt while the more effective isolates provide at least a 15 $cm^2$ melt value. For many imitation cheese applications, those isolates providing a melt value of at least 20 $cm^2$ and advantageously at least 25 $cm^2$ may be obtained by practicing the present invention.

Isolates which upon reconstitution in water ($\simeq 15\%$ d.s.b. isolate in 20° C. water) possess a broad viscosity range (e.g. from 80 cps to 100,000 cps and higher) have been found to be suitable for use in imitation cheese. The isolates which form more viscous aqueous solutions (e.g. greater than 1,000 cps) appear to perform better than those of a lesser viscosity. Gel filtration chromatographic studies tend to show these high viscosity isolates contain an atypical and disproportionately higher protein fraction of a molecular weight (M.W.) greater than 1 million. Unlike conventional isolates, these high viscosity isolates typically will contain the greater than $1 \times 10^6$ M.W. fraction as the major protein component (weight basis) with the higher viscosity producing isolate products containing 65% by weight or more of the greater than 1 million M.W. fraction.

The isolates of this invention may be suitably prepared by a method comprising the steps of: (a) extracting water-soluble protein constituents from an aqueous vegetable proteinaceous material slurry at a pH between 6.5 and 8.0 and a temperature of less than 50° C., (b) recovering at least a major weight portion of the extracted water-soluble protein constituents from the aqueous slurry; (c) dissolving the recovered protein constituents in water to form an aqueous solution thereof; (d) heating the aqueous solution to a temperature of at least 60° C. at a pH from 6.8 to 7.5 for a period of time sufficient to impart a melt value of at least 15 $cm^2$ to the dissolved protein constituents in said aqueous solution, and (e) recovering the dissolved heated protein constituents from said aqueous slurry.

The extraction should be conducted in such a manner so as to effectively extract all of the water-soluble protein components from the seed material and to avoid hydrolysis of the vegetable protein product. Although slightly acidic extraction conditions may be used, (e.g. pH 6.5 or higher) definitive advantages are obtained under the slightly alkaline extracting conditions (e.g. pH<8.0). The extraction step may be conducted on a batch or continuous basis (e.g. countercurrent extraction).

Defatted soybean materials when slurried with water will typically yield a slurry having a pH 6.6-6.7. More effective extraction of these two most predominant soy protein fractions (i.e. 7S and 11S) is obtained by adjusting the slurry pH to a neutral or slightly alkaline pH. A variety of organic and inorganic bases may be used for this purpose. Divalent cations such as the alkaline earth hydroxides are prone to form complexes with the indigeneous extracts of the seed material (e.g. proteins, phytins, carbohydrates thereof, etc.) and should be avoided. It is advantageous to utilize monovalent cationic hydroxides such as alkali metal hydroxides, to adjust the slurry to the appropriate alkalinity for the extraction and treatment step. When sodium hydroxide is used as a pH adjusting base, about 0.1 to about 1.0 parts (d.s.b.) for each 100 parts by weight protein d.s.b. will typically yield an extraction or treated pH between 7.0 to about 8.0. To operate within the pH 7.0-7.5 range, the amount of sodium hydroxide added to the extractant slurry (100 pbw protein d.s.b.) will typically fall within the range of about 0.2 to about 0.8 parts by weight. A corresponding equivalency of potassium hydroxide, about 1.4 times more, is required when it is used as an adjusting base.

Vegetable proteinaceous materials useful in preparing the isolates include defatted proteinaceous materials obtained from grain and oil-bearing seed materials such as peanuts, cottonseeds, soybeans, sesame seeds, rape seed, safflower seeds, sunflower seeds, corn, wheat mixture thereof and the like.

Proteinaceous materials obtained from leguminous oil-bearing seed sources, particularly soy, are advantageously utilized as a vegetable protein source. Illustrative soy materials include soybean meal, flours, grits, soy protein concentrates and isolates, mixture thereof. High as well as low NSI soybean raw materials may be used.

In the manufacture of defatted leguminous materials the oils are typically extracted from dehulled seed materials (e.g. grit or flake form) with a hydrocarbon solvent system such as hexane. Most manufacturers rely solely upon hexane to extract the oil. Although the hydrocarbon extraction effectively removes substantially all of the oil, it cannot effectively remove certain malodorous and flatulating factors from the seed material. These difficult to extract factors along with other non-proteinaceous contaminants require a water-miscible organic solvent system (e.g. alcohol, acetone, etc.) in order to be effectively removed from the seed material. By extracting or treating the vegetable material with aqueous solutions of such water-miscible solvents (e.g. hexane/alcohol/water, alcohol/water, etc. system), such as disclosed in U.S. Pat. Nos. 3,734,901 and 3,878,232, *Jr. of the American Oil Chemist Society* 37:217-219, 1960 and copending U.S. patent application Ser. No. 973,194 now U.S. Pat. No. 4,265,925 entitled "Bland Vegetable Protein Product and Method of Manufacture" filed Dec. 26, 1978 by Campbell et al.), exceptionally bland isolates with improved functionality in imitation cheese formulations are obtained.

Full-fat soybean flakes or grits extracted with an azeotropic solvent mixture of hexane, lower alkanol ($C_1$–$C_3$ and particularly ethanol) and water (e.g. provided by moisture content of the bean or with added water), partially or substantially hexane defatted soy flakes or grits further submitted to the azeotropic solvent mixture to extract these difficult to extract factors as well as concentrates obtained by aqueous ethanol extractive techniques are particularly suitable starting raw materials for making the isolates of this invention. Bland, defatted soy flakes or grits subjected to azeotropic hexane/ethanol/water extraction and desolventization are the preferred vegetable protein source material for making the isolates of this invention.

The water to proteinaceous material ratio of the slurry may vary considerably depending upon the nature of the protein source material. In the case of soy proteins (e.g. soy grits, defatted soybean flakes, soy concentrates, soy isolates, etc.), the water to material ratio illustratively ranges from about 8:1 to 20:1 or higher. At the high solids level the extracted protein tends to develop an excessive viscosity for effective handling and extraction. More dilute concentrations are generally impractical and uneconomical. Pragmatically the water to material weight ratio will usually range from about 8:1 to less than 15:1 and advantageously at a weight ratio of about 9:1 to about 12:1.

The temperature of the extraction medium is maintained at a level sufficiently low so as to prevent permanent heat denaturization of the protein molecules, yet high enough to permit effective protein extraction. Extracting temperatures ranging from about 10° C. to 50° C. (or higher, provided not for prolonged periods of time) may be utilized under the appropriate extracting conditions to extract the vegetable protein from the seed material. Extraction temperatures ranging between 25° C. to about 35° C. (preferably at about 30° C.) are particularly effective.

The presence of a small amount of a water-soluble salt of sulfurous acid will significantly enhance the efficacy of the protein extraction and facilitate the procurement of the desired end product. Such salts permit the extraction to be conducted at a higher protein solids level while also improving upon the total yield of extracted protein from the seed material. The water-soluble sulfurous acid salt concentration is most appropriately at a level which will measurably decrease the viscosity of the protein solution in comparison to that which would have been achieved had it not been added to the extraction medium. For most applications, the sulfurous ion concentration will typically be greater than $2.2 \times 10^{-4}$ mole for each mole of protein nitrogen. (Preferably at $4 \times 10^{-4}$–$4 \times 10^{-3}$).

The water-soluble salt of sulfurous acid effectively reduces the vegetable protein disulfide linkages to thiol groups. It is believed that this may permit molecular and intermolecular restructuring of the tertiary and quaternary structure of the protein within the aqueous extract. This results in significantly greater water-solubility and significant concomitant reduction in solution viscosity.

Aqueous sulfurous acid solutions or precursors such as sulfur dioxide or water-soluble salts that form sulfurous acid when added to water may be used for this purpose. Illustrative water-soluble salts of sulfurous acid include the alkali metal salt sulfites (e.g. potassium or sodium salts of sulfite, bisulfite, pyrosulfite, lithium sulfite) and other water-soluble producing salts of cations (e.g. ammonium sulfite, bisulfite, etc.), mixtures thereof and the like. Polyvalent metal salts known to form chelates with the proteins or cause its precipitation in aqueous solutions should be avoided.

It is desirable to remove insolubles from the protein extract. If allowed to remain, such insolubles will occlude or form complexes with the protein isolate. By removing such insolubles, it is possible to obtain a thermoplastic isolate which will heat-set into a clear, translucent gel. Conventional techniques such as filtration or centrifugation are suitable clarifying means for removing substantially all the insolubles from the extract.

The clarified vegetable protein may then be appropriately separated from the solubles (e.g. soy solubles) by adjusting the extract to the isoelectric point of the protein to curd or precipitate it therefrom. In general, the curding pH for most vegetable proteins typically falls within the pH 4.0–5.0 range and most suitably between about pH 4.2 to about 4.6 for soy protein. For soy protein isolates processed in accordance with this invention, a curding pH between about 4.3 to about 4.5 has been found to be particularly effective.

Conventional organic or mineral acids may be used to adjust the pH and curd the protein isolates from the clarified solution. Lactic acid, citric acid and the like are illustrative organic acids while sulfurous, hydrochloric, sulfuric and phosphoric are illustrative mineral acids. The protein curd may be separated from the soy solubles by conventional removal techniques such as filtering, centrifugation, decantation, etc.

It is advantageous to remove substantially all of the residual or occluded water-soluble carbohydrates, proteins, minerals and other contaminants from the curd by conventional washing techniques which prevents the protein from redissolving (e.g. at the protein isoelectric pH, etc.). The presence of the water-soluble salts of sulfurous acid, as a wash ingredient, may be used to effectively retain the protein molecules in a suitable form for further processing.

The remaining isolate processing steps are designed to provide the protein in a stable and appropriate molecular form so as to permit its conversion and recovery as an isolate which possesses the desired melt characteristics. Placing the protein molecule in a stable and appropriate molecular form generally entails dissolving the protein in water to provide a proteinate solute which then can effectively be converted by the heating step into an isolate having a melt value of at least 15 $cm^2$.

In general, this may be accomplished by neutralizing the curded protein with a sufficient amount of base to form an aqueous protein solution which has a pH within the range used in the aforementioned extraction step. Suitable bases for the neutralization and redissolution of the curded protein in water include those mentioned hereinbefore for adjusting the slurry to the appropriate extraction pH level. Excessively high or low pH levels fail to provide a suitable substrate for converting the dispersed protein into an isolate having the desired melt characteristics. More alkaline pH adjustments (e.g. >pH 8.0) adversely affect the product taste (e.g. soapy taste) and can result in undesirable hydrolyzates or by-products.

Definitive advantages are obtained by converting the protein molecules to a water-soluble proteinate salt. This may be accomplished by neutralization of the protein molecules with a sufficient amount of a monovalent cationic base to provide a slightly alkaline proteinate solution thereof (e.g. pH 7.0–7.8). Advantageously the aqueous proteinate solution will have a pH of less than 7.5 and preferably at about a pH 7.0–7.3.

A small amount of a water-soluble sulfurous acid salt may be used to effectively heat treat the protein solute. Such water-soluble salts permit the processor to operate at a higher protein concentration while maintaining the solution viscosity at a satisfactory processing level. The salts also appear to prevent premature chemical and/or physical restructuring of the protein into non-functional components and to maintain the protein solute in a form suitable for its thermal restructurization into a product having a high melt value. The amount of sulfurous acid salt needed for this purpose is exceedingly small. Trace amounts (e.g. analytically detectable amounts of salts) such as residual levels remaining in the product after the extraction step or curd washing with sulfurous acid or salts will be generally sufficient for this purpose. Alternatively an effective level of the water-soluble salts may be directly added to the aqueous proteinate solution during its preparation or prior to its thermal treatment. Excessive sulfurous acid salt levels can adversely affect the organoleptic characteristics of the isolate for imitation cheese applications and therefore should be avoided.

The resultant aqueous solution is then heated to a temperature of at least 60° C. for a period of time sufficient to impart a melt value of at least 15 cm$^2$ to the dried isolate product. Thermal processing conditions affecting melt properties include solution pH, time, amount of shear and protein solute concentration. Illustrative heating temperatures range from 60° C. up to about 110° C. or higher. Longer heating intervals (e.g. about 1 hour or longer) are typically required for the lower processing temperatures with significantly shorter heating times (e.g. about ½ second or less) being more suitable at the more elevated temperatures. From an overall processing standpoint, temperatures ranging from about 65° C. to about 95° C. may be effectively utilized to produce dry isolates of a melt value of at least 20 cm$^2$. The preferred heating temperature ranges from 70° C. to about 90° C.

High shear devices (e.g. homogenizers, scraped surface heat exchangers, etc.) and low shear devices (e.g. mixing vessels equipped with slow speed impeller, thermally jacketed tubular reactors, etc.) can be used to heat the aqueous solution. The processing shear and temperature affect the viscosity characteristics of the reconstituted dry isolate. High shear devices normally produce dry isolates which, when reconstituted with water, have a much higher aqueous solution viscosity (e.g. 60,000 cps at 15% and 20° C.) than those made at low shear (e.g. 80 cps). The viscosity characteristics of these isolates, including those produced under high shear, are substantially lower than conventional isolate products (e.g. less than 100,000 cps versus >200,000 cps).

To insure appropriate restructuring of the protein molecules, it is advantageous to thermally treat the aqueous solution for at least ten seconds. Within the 70° C.–90° C. range, a twenty second heat treatment at 70° C. will result in an isolate of a lower melt value in comparison to one processed at 80° C. for an equivalent time interval. In general, a hold time between 15 and 60 seconds and usually from about 20 to about 40 seconds will produce a satisfactory product (both low and high shear). Aqueous protein solutions homogenized by successive pressure and cavitation cycling (e.g. centrifugal homogenizers) such as in U.S. Pat. No. 4,234,620 by Howard et al. are particularly effective in producing the isolates of this invention.

Restructuring of the protein molecules into the appropriate aggregate structure appears to directly relate to an observed apparent viscosity reduction. Prior to the heat treatment the aqueous solution often has a higher viscosity than the heat treated solution. This viscosity reduction facilitates isolate dehydration and permits one to operate at a higher protein solids level. In general, the thermally processed product will have an apparent viscosity (at 10% d.s.b. and 20° C.) ranging from about 25% to about 75% of the unheated solution with a 40%–60% viscosity reduction being most typical.

Since the protein molecules are preconditioned into a form conducive to gelling, it is desirable to cool the heat treated solution to a non-gelling temperature prior to the isolate recovery. Cooling of the aqueous solution to less than 70° C. (e.g. 55° C.–65° C. or lower) will typically inhibit the isolate from gelling and place it in a form suitable for recovery.

Although the protein concentration of the aqueous solution may broadly range from about 5% to about 30% by weight (d.s.b.) the protein solids level is advantageously at least 10% by weight and less than 25% by weight and preferably within the 10%–20% range.

Upon completion of the heating step, the heated protein constituents are recovered from the aqueous slurry in a form suitable for use in imitation cheese formulations. This may be appropriately accomplished by conventional dehydration techniques such as freeze-, vacuum-, drum-, spray-, etc. drying. The dehydrated isolate product will normally contain less than 10% moisture with a total moisture content ranging from about 4% to about 8% being most typical. Spray dryers operated at outlet temperatures ranging from about 70° C. to about 115° C. (preferably about 80° C.–100° C.) are particularly effective in producing the dry isolates of this invention.

In another embodiment of the invention unhydrolyzed, unfractionated soy isolates are converted into aqueous isolates having a melt value of at least 15 cm$^2$ and formulated into imitation cheese products. Dry isolates, isolate curds or isolate solutions, which have neither been subjected to chemical and/or enzymatic hydrolysis to cause substantial hydrolysis and concomitant molecular weight reduction of the protein molecules nor fractionation techniques to remove or separate the vegetable protein constituents into isolates of differing molecular weights, may be utilized as starting materials for practicing this embodiment of the invention.

The soy isolate starting materials should initially contain a sufficient level of 7S and 11S fractions to permit the isolate product to be converted to an isolate having a melt value of at least 15 cm$^2$. If soy isolates are utilized to practice this embodiment of the invention, the isolate starting material should contain at least a major portion of its 7S and 11S protein components and preferably substantially all of its 7S and 11S protein components. Fractionation techniques such as isoelectric pH adjustment or curding which selectively precipitate the 11S fraction at the exclusion of the 7S fraction (e.g. pH 5.3–5.7), ultra-filtration or membrane separation, cooling, etc. fractionating techniques which cause separation or depletion of either the 7S or 11S fraction from the recovered isolate product should be avoided.

The unhydrolyzed, unfractionated protein isolate solutions can be directly converted into a functional vegetable isolate for imitation cheese applications. In general, this method consists essentially of providing an aqueous unhydrolyzed protein solution in which at least 90% by weight of the total protein isolate weight has been converted to protein solute (i.e. dissolved in the aqueous solution), heating the aqueous solution to a temperature of at least 60° C. for a period of time sufficient to impart a melt value of at least 15 cm$^2$ to said protein isolate solute, recovering the protein isolate in a form suitable for use in an imitation cheese and preparing an imitation cheese product wherein at least 20% by weight of the milk protein in said imitation cheese product has been replaced with said protein isolate.

By practicing this embodiment of the invention, dry unhydrolyzed and unfractionated protein isolates having inadequate melt values for imitation cheese may be directly converted into an isolate having a melt value of at least 15 cm² which may then be formulated into a satisfactory imitation cheese product. The heat treated isolate solutions of a melt value of at least 15 cm² may be directly formulated as an aqueous solution into the imitation cheese product with or without the additional step of recovering the isolate in the dehydrated form. Soy isolate solutions subjected to the protein extraction conditions, curding, redissolution and heat treatment steps as defined hereinbefore provide particularly effective isolate sources for preparing imitation cheese products wherein at least one-third of the total milk protein weight (preferably at least 40% by weight) of the imitation cheese recipe is replaced with the subject soy isolate.

Conventional recipe ingredients used to prepare imitation cheese products may be utilized to prepare the imitation cheese products of this invention. Included amongst such conventional recipe ingredients are fatty glycerides (e.g. mono-, di- and triglycerides of $C_{12}-C_{22}$ fatty acids, hydrogenated vegetable oils, animal fats, etc.), caseinate (preferably calcium and/or sodium caseinate as the major protein for its water-absorption, solubility and emulsification properties), coloring, artificial and/or synthetic flavoring agents, acids, emulsifiers, preservatives, stabilizers, sweeteners, encapsulated flavor imparting enzymes, and other conventional ingredients for imitation cheese or cheese analog products. Additional imitation cheese and/or analog ingredient and recipe information may be found in *Food Product Development*, June 1980, page 42 and 44, *Cheese Analog Advantages Range Beyond Economical Aspects* by M. J. Bozzi which reference is incorporated into and made a part of this specification.

The isolates of this invention are used as a caseinate replacement in such imitation cheeses or cheese analogs. The isolate is generally used to replace from about 20%–60% by weight of the caseinate with about a one-third to about one-half replacement of caseinate with the subject isolate (d.s.b.) being most typical.

In preparing imitation cheese products or cheese analogs, the functional efficacy of the vegetable isolate can be destroyed by prematurely subjecting the isolate to excessive shear. By placing at least 90% and advantageously substantially all of the vegetable protein isolate (e.g. greater than 95%) into solution before homogeneously blending the fatty glyceride and caseinates into the recipe, imitation cheese products having a melt value of at least 15 cm² can be obtained.

In preparing the imitation cheese products, the isolate may be placed into an aqueous solution form before it is subjected to excessive shear, especially at elevated temperatures. Whether or not any given shear will adversely affect its performance in imitation cheese products can be readily ascertained by its melt value. Shear causing a melt value decrease of less than 15 cm² should be avoided. A particularly suitable process for preparing an imitation cheese product containing the isolate products of this invention comprises the steps of: (a) preparing an aqueous solution of the vegetable isolate having a melt value of at least 15 cm² and (b) homogeneously mixing together said aqueous solution and a uniform blend comprised of fatty triglycerides and mild protein at a temperature exceeding the melting point of said fatty triglyceride and under mixing conditions sufficient to provide an imitation cheese product having a melt value of at least 15 cm².

By separately preparing the aqueous protein isolate solution and uniform blend comprised of the milk caseinate and molten fat and thereafter homogenizing the aqueous solution and uniformly blending together along with the imitation cheese ingredients at a temperature above the fat melting point, a molten homogeneous imitation cheese product which retains the desired melt characteristics can be obtained. Under this technique, the water-absorption and emulsification properties of the caseinate appear to be sufficiently inhibited during the initial stages of the homogeneous admixing step to permit the isolate to be uniformly and homogeneously distributed throughout the imitation cheese product. Uniformly blending together the caseinate and the molten fat also apparently coats the surface of the caseinate particles which in turn reduces the caseinate solubility and water-absorption properties to permit more uniform isolate distribution throughout the imitation cheese product. Shearing of the restructured isolate into a non-functional isolate component may also be prevented by the lubricating effect provided by the fat coated caseinate particles during its homogenization thereof at elevated temperatures.

Improper recipe preparation of the molten homogeneous imitation cheese product can destroy the melt properties of the caseinate and isolate combination. The melt characteristics of the finished product provides the means for determining whether or not excessive stress has been placed upon the recipe system to destroy the melt properties of the imitation cheese product.

Excessive shear upon the isolate during any stage of the imitation cheese preparation can destroy its functionality. Homogenization conditions which yield a cooled imitation cheese product having a melt value of less than 15 cm² should be avoided. As more fully explained in Example 11, the melt value of the finished imitation product can be controlled by the amount of shear used to homogenize the recipe ingredients at elevated temperatures. In general, the melt value proportionally decreases as the homogenization shear is increased in the imitation cheese preparation.

Upon completion of the homogenization step the homogeneous imitation cheese product may be molded or preformed into the desired configuration and cooled. It will possess remelt properties and may be used to simulate the functional attributes of a meltable natural cheese product.

The following examples are illustrative of the invention.

EXAMPLE 1

A dry soy isolate suitable for use in imitation cheese products was prepared by initially slurrying 1200 pbw bland defatted soy flakes[1] in 17,500 pbw water (30° C.) under low speed agitation. To facilitate the protein extraction from the soy flakes 0.6 pbw sodium metabisulfite was added to the slurry followed by the addition of 6.75 pbw sodium hydroxide (50% water solution) to adjust the slurry to a pH 7.1. While maintaining the slurry at pH 7.1 and 30° C., the slurry was continuously stirred for 75 minutes to complete the extraction of water-solubles from the soy flakes.

1-BLAND 50-Desolventized soy flakes defatted with a hexane/ethanol/water azeotrope-manufactured and distributed by the A. E. Staley Manufacturing Company, Decatur, Ill.

Then 400 pbw filter aid[2] was added with continual stirring to the extracted slurry. The extracted slurry was clarified by continuously recycling it through a filter press (cloth filter) until the water-insolubles had been removed and a clear filtrate product was obtained.
2-diatomaceous earth The clear filtrate was adjusted to pH 4.3-4.5 with 51 pbw 20° Bé muriatic acid while continually stirring at a low speed. The precipitated curd was then allowed to quiescently settle in the curding tank for one hour. The supernatant was withdrawn by decantation. A water wash consisting of 41,700 pbw water, 13 pbw 20° Bé muriatic acid (pH 4.5) was then added to the decanted curded soy protein and washed for one hour under low speed stirring. Thereafter the washed curd was allowed to quiescently settle for an hour in the curding tank. As much clear supernatant as possible was then decanted from the washed curd.

The curd was pumped to a neutralizing vessel equipped with a high speed impeller agitator. The curd was dissolved and converted to an aqueous sodium proteinate solution by slowly adding 15 pbw 50° Bé sodium hydroxide to the curd while stirring vessel contents at high speed. The solution (pH 7.1) was held, while slowly stirred, for an additional period of time sufficient to permit a decrease in Brookfield viscosity of the solution (at 20° C., 12 rpm, Spindle #1) to less than 100 cps (about 2 hours).

Stirring of the solution was then discontinued and it was pumped through a steam jacketed tubular reactor (0-10 steam psig measuring ½ inch I.D.×60 ft.) and an unjacketed 1 inch I.D.×20 ft. discharge pipe at a rate sufficient to provide an effluent product temperature of 71° C. The solution residence time in the jacketed reactor was 20 seconds and 30 seconds in the unjacketed pipe section. The heated effluent was immediately cooled to 55° C. by flash cooling in a vacuum evaporator operated under 25 inch mercury pressure, pumped (piston pump operated at 1200-1500 psig) to a Rogers Horizontal Spray Dryer equipped with eight spray nozzles (orifice-Cat. No. SIT 69 and Core Cat. No. SIT-20 by Spraying Systems, Inc., Wheaton, Il.), and spray-dried (150°-155° C. inlet and 71°-77° C. outlet temperatures) under a very slight vacuum (0.02-0.04 inch water draft). The spray-dried product when reconstituted in water at 15% d.s.b. had a solution viscosity of 340 cps (Brookfield viscosity—20 rpm—20° C.). The spray-dried product had an NSI of 100.

EXAMPLE 2

The process of Example 1 was repeated excepting those processing steps immediately following the dissolving and conversion of the washed curd to the sodium proteinate solution up to the spray-drying step (i.e. 2 hour viscosity reduction step, heating solution in the tubular reactor and flash cooling under a vacuum) were conducted differently.

In this example, the aqueous sodium protein solution (pH 7.1) was directly pumped to a centrifugal homogenizer. The centrifugal homogenizer was a Supratron Model 200 Series, manufactured and distributed by Supraton F. J. Zucker KG, Dusseldorf, Federal Republic of Germany, equipped as a Model 247.05 with a fine grinding head, and inlet pipe fitted with a steam injection unit for temperature control and a discharge pipe equipped with a thermal control ball valve for back-pressure regulation with internally positioned pressure and temperature gauges. The centrifugal homogenizer was operated at 6,150 rpm and 0.9 mm clearance.

The pH 7.1 solution was fed to the centrifugal homogenizer at a flow rate of 8 gallons/min. with the steam injection unit being operated under sufficient steam pressure to deliver an effluent 80° C. product to the heat exchanger. The total heating residence time within the centrifugal homogenizer and discharge pipe was 20 seconds.

The discharge pipe was connected to a vacuum evaporator utilized as a heat exchange to cool the heated product to 55° C. Heat exchanging was accomplished by using water as a coolant in the heat exchange pipe instead of steam and operating the evaporator without a vacuum.

The cooled soy isolate solution was then spray-dried in accordance with Example 1.

The spray-dried product produced a 52,000 Brookfield viscosity (20 rpm-20° C.-@15% d.s.b) and an NSI of greater than 98.

EXAMPLE 3

Gel filtration chromatographic studies were conducted upon Examples 1 and 2 spray-dried isolate products and a non-heated spray-dried product prepared in accordance with Example 1 except for its subjection to the tubular reactor heat-treatment step. The non-heated sample was reconstituted in water at a pH 7.2 and 27° C. and spray-dried per the Example 1 spray-drying methodology. The non-heat-treated spray-dried isolate sample had a 100 NSI and yielded an aqueous solution viscosity (at 20° C., 20 rpm, Spindle No. 1 and 15% isolate d.s.b. in water) of 60 cps.

The gel filtration chromatography was performed on a Pharmacea 90 cm×1.3 cm I.D. column containing BioGel A-5 M resin, 100-200 mesh (BioRad Laboratories, Richmond, Calif.). A flow rate of 10 ml/hr. was maintained with Pharmacea P-3 parastaltic pump (Pharmacea Fine Chemicals, Upsala, Sweden, 2 mm I.D. tubing). The elution was monitored at 254 nm (LKB Instruments, Inc., Rockville, Md. and 1 ml. fraction were collected LKB Model 7000 Ultrorac[(R)] fraction collector). The column buffer was comprised of 0.0325 M $K_2HPO_4$, 0.0026 M $KH_2PO_4$, 0.40 M NaCl, and 0.01 M 2-mercaptoethanol (reference W. J. Wolf, G. E. Babcock and A. K. Smith "Purification and Stability Studies of the 11 S Component of Soybean Proteins", Archieves of Biochemistry and Biophysics 99, 265-274 (1962)).

A 5% (w/w) solution of protein in Wolf's Buffer (0.0325 M $K_2HPO_4$, 0.0026 M $KH_2PO_4$, 0.40 M NaCl, 0.01 M 2-mercaptoethanol) was prepared and dialyzed (Spetrapor membrane tubing #3 18 mm, M.W. cut-off 3500) overnight at 4° C. against Wolf's Buffer. The sample was then centrifuged at 10,000 rpm (12,000×G) (Sovall refrigerated centrifuge, SS-34 head) for 30 minutes at 5.0° C. One ml of the supernatant was applied to the column.

Individual fractions were assayed for protein as described by Bradford, M. M., Anal. Biochem. 72, 248-254 (1976). To 100 aliquots, 5 mls. of Bradford protein reagent was added. After mixing, the absorbance was read at 595 nm against a buffer reagent blank on the Beckman Acta II spectrophotometer.

Protein calculations were based on a standard curve using Bovine Plasma Gamma Globulin (BioRad Laboratories, Richmond, Calif. Standard I-#500-0005). The gel filtration chromatography column was calibrated with standards of known molecular weight thereby allowing the molecular weight of the samples to be evaluated. These standards included Apoferratin, Aldolase, Conalbumin, OValbumin and Cytochrome C. The void volume was determined with Dextran 2000. The column parameters were identical for both calibration and sample determinations.

For comparative purposes, molecular weight zones were chosen by use of a molecular weight standard curve. These zones were 2,000,000 M.W. and higher, 2,000,000–1,000,000 M.W. 1,000,000–200,000 M.W. and less than 200,000 M.W. The tabulated protein distribution represents the percent of total protein which elutes within a designated molecular weight region. The results of these studies are as follows:

| | MOLECULAR WEIGHT DISTRIBUTION (% TOTAL PROTEIN) | | | |
|---|---|---|---|---|
| | >2,000,000 | 2,000,000 to 1,000,000 | 1,000,000 to 200,000 | <200,000 |
| non-heated sample | 18.4 | 15.9 | 51.0 | 14.7 |
| Example 2 | 55.4 | 11.0 | 12.2 | 21.4 |
| Example 1 | 35.6 | 16.9 | 35.3 | 12.2 |

As shown above, the thermal treatment of Example 1 and 2 aqueous isolate solution prior to drying causes a substantial molecular weight distribution shift from the $1 \times 10^6 - 2 \times 10^5$ M.W. zone to the greater than $1 \times 10^6$ M.W. zone. The major molecular weight distribution for non-thermally treated isolate (i.e. 51%) existed within the $1 \times 10^6 - 2 \times 10^5$ M.W. region with 34.335% thereof being greater than $1 \times 10^6$ M.W. size and 14.7% less than 200,000.

In contrast, a disproportionately higher percentage of protein aggregates having a molecular weight greater than $1 \times 10^6$ (e.g. 52.5%) occurs as a result of the tubular reactor heat treatment step of Example 1. A similar restructuring of the smaller molecular weight proteins into higher molecular weight protein aggregates arises as a result of the Example 2 aqueous isolate solution heat treatment step (i.e. 66.4% $1 \times 10^6$).

As shown by the above results, the heat-treatment step shifts the most prevalent M.W. region from the $1 \times 10^6 - 2 \times 10^5$ region to the greater than $1 \times 10^6$ region with the $1 \times 10^6$ and higher region representing at least a major percent of the total distribution in the case of Examples 1 and 2.

The proportion of $1 \times 10^6$ M.W. and greater protein aggregates to the less than 200,000 has also been significantly altered by the heat treatment step. For the non-heat treated isolate, the greater than $1 \times 10^6$ M.W. region exceeds the less than $2 \times 10^5$ M.W. zone by a factor of 2.3. The total percentage of greater than $1 \times 10^6$ M.W. region for the Example 2 isolate exceeds its less than $2 \times 10^5$ M.W. fraction by at least threefold (3.1 times greater) whereas in Example 1 the greater than $1 \times 10^6$ M.W. region exceeds its less than $2 \times 10^5$ M.W. region by at least fourfold (e.g. 4.3 times greater).

This data clearly illustrates that a substantial shift in the molecular weight distribution arises as a result of thermally treating aqueous soy protein solutions at elevated temperatures. Caseinates are known to be largely comprised of water-soluble, high-molecular weight hydrocolloids or protein aggregates. By heating undigested soy isolate solutes at elevated temperatures a shift in its molecular weight distribution to larger molecular weight fractions more closely simulating those of the casein hydrocolloids occurs. Another interesting observation from the above data is that the most prevalent (meaning more than any other particular region) molecular weight region shifted from the $1 \times 10^6 - 2 \times 10^5$ M.W. region to the greater than $2 \times 10^6$ M.W. region with the greater than $1 \times 10^6$ M.W. region (inclusive of both the $2 \times 10^6 - 1 \times 10^6$ and greater than $2 \times 10^6$ M.W. region) constituting the major percentage in contrast to the unheated sample wherein the $1 \times 10^6 - 2 \times 10^5$ M.W. region constitutes a major percentage of the total molecular weight distribution of the buffered extract.

EXAMPLE 4

The dry soy isolates of Examples 1 and 2 were separately formulated into an imitation cheese product consisting of the following ingredients:

| INGREDIENTS | PARTS BY WEIGHT |
|---|---|
| Water | 51.24 |
| Partially hydrogenated cottonseed/ soybean oil blend (Wiley melting point 38–41° C.)[1] | 20.0 |
| Soy isolate | 12.5 |
| Sodium Caseinate | 12.5 |
| Salt (sodium chloride) | 2.0 |
| Lactic Acid | 0.98 |
| Sodium aluminum phosphate | 0.78 |

[1]Duromel

The imitation cheese test samples were made by initially dissolving 75 g of the soy isolate in 307.4 g water by mixing in a Waring Blendor (Model No. CB-4) operated at a low speed. The resultant protein was then transferred to a 1500 ml. plastic beaker. A uniform blend of sodium caseinate and hydrogenated oil were separately prepared by uniformly blending 120 g of melted oil (65° C.) into sodium caseinate (75 g). The sodium caseinate/oil blend was then slowly admixed to the soy isolate solution followed by the admixing thereto of a 5 ml. aqueous solution consisting of 4.7 g sodium aluminate phosphate, 12 g sodium chloride and 5 g water. The resultant mixture was then homogenized in an Ultra-Turrex, Tekmar Company Model No. S-45 homogenizer equipped with a Generator G-450 operates at a 60 speed setting for 5 minutes.

The homogenized ingredients were then transferred to a stainless steel beaker coated lightly with a lecithin release agent[1] and heated in a water bath maintained at 76° C. for 5 minutes with continuous agitation (Lightnin Mixer equipped with high shear blades and a variable speed control operated with a Variac set at 85). The lactic acid (5.9 g) was then slowly added to the blended mixture and the water bath temperature was then increased to 90° C. with continuous mixing at the 85 Variac setting for an additional 5 minutes. The resultant smooth, homogeneous, imitation cheese formulation was then poured into a cheese mold and refrigerated (at 5° C.) for 20 hours. The cooled imitation cheeses were removed from the molds, sliced into 5.5 mm thick slices with a cheese slicer and cut into cylinders with a circular cutter which measured 47 mm in diameter. The resultant test samples were then placed in a petri dish (90 mm dia. × 20 mm height) precoated with an atomized spray coat of release agent[1]. The test samples were then baked in a preheated oven at 425° F. for 7 minutes.

In the closed melt tests, the petri dish was covered with a petri dish covering during the baking cycle. The baked test samples were ambiently cooled (22° C.) for 20 minutes. A template (Schreiber cheese melt test) graduated in solid concentric circular lines each circumscribing an additional 10 square centimeter area over the unbaked sample diameter (i.e. 47 mm) and further subgraduated in cm² units by broken concentric lines was used to measure the total square centimeters increase of the baked sample over the unbaked test sample area. The petri dish containing the baked test sample was placed over the template so that the largest possible circle was completely covered by the baked test sample. The total square centimeter increase in area over the unbaked area (i.e. melt value) may be then directly read from the graduated template.

1-Pam

EXAMPLE 5

This example illustrates how soy isolates which do not possess sufficient melt values for use in imitation cheese may be converted into an isolate product compatible with imitation cheese formulations. A spray-dried isolate product was prepared in accordance with Example 1 except for the tubular reactor heat treatment step. The reconstituted aqueous protein solution at 27° C. and pH 7.2 was directly spray-dried without passing it through the tubular reactor at elevated temperatures. Physical testing of this dry isolate indicated it had a 100 NSI and produced a Brookfield viscosity of 180 cps. The melt value of this dry isolate when tested under the imitation cheese recipe conditions of Example 4 was unacceptable.

The procedure for converting this low melt value into a high melt value product comprised dissolving the dry isolate (at 20% by weight d.s.b.) in water in accordance with Example 4 to provide an aqueous solution thereof. The foamed protein of the reconstituted aqueous solution was separated by centrifuging the aqueous solution at 2000×G. The centrifuged liquid portion (Brookfield viscosity of 4100 cps) was transferred to a 6 oz. tin can (tuna can) sealed and cooked at 90° C. for 30 minutes in a hot water bath to heat-set the soy isolate into a gel.

A 7.5 mm gel penetration reading with the penetometer was obtained after allowing the heat-set gel to cool to 22° C.

The resultant heat-set gel was then directly homogenized along with the remaining imitation cheese ingredients, employing the homogenization apparatus and conditions and the lactic acid incorporation techniques of Example 4.

The melt value for the resultant imitation cheese product was 38 cm². The melted imitation cheese discs had good sheen and plasticity and were not doughy. The gel penetration characteristics for the cooled melted imitation cheese sample was 3.5 mm.

Soy isolates in the reconstituted solute form, as obtained directly from the heat-treatment step or dry isolate product which have been heat treated, may be directly used to prepare imitation cheese products of an acceptable melt value by means of the pregelling technique of this Example or the recipe conditions of Example 4.

EXAMPLES 6-10

The following Examples illustrate the preparation of different dry isolate products with different starting raw materials and processing conditions. In Examples 6, 7 and 10 soybean grits were used and bland defatted flakes were employed in Examples 8-9. The tubular heat reactor of Example 1 was used to heat treat the Examples 6-8 and 10 aqueous isolate solutions with the Example 2 heat treatment apparatus being used in Example 9. The processing variables and dry isolate product test results are tabulated below:

| Example No. | Aqueous isolate soln. heating temp. | Extraction BSS*mM | Washing BSS*mM | Reconstituted dry isolate (@22° C. & 15% d.s.b) | | Melt Value (cm²) |
|---|---|---|---|---|---|---|
| | | | | NSI | Viscosity | |
| 6 | 27° C. | 0.12 | 0 | 100 | 55 cps | 5 |
| 7 | 82° C. | 0.12 | 0 | >95 | 18500 cps | 27 |
| 8 | 71° C. | 0.05 | 0.3 | >98 | 80 cps | 35 |
| 9 | 71° C. | 0.05 | 0 | >95 | 15500 cps | 38 |
| 10 | 71° C. | 0.05 | 0.3 | 97 | 80 cps | 35 |

*sodium metabisulfite

EXAMPLE 11

This example illustrates that the homogenization conditions used to prepare the imitation cheese product has an affect upon melt value. In this example, the Example 2 dry isolate and another heat treated isolate (identified as Run 12) having a Brookfield solution viscosity of 60,000 cps were used to prepare imitation cheeses in accordance with Example 4. The sole imitation cheese processing variable was the Tekmar homogenizer speed setting which was set at 60 and 80 for each 5 minutes of operational running time.

The following melt value results were obtained:

| Dry isolate Sample | Viscosity | Melt Value @60 setting | Melt Value @80 setting |
|---|---|---|---|
| Example 2 | 52,000 cps | 30cm² | 10cm² |
| Run 12 | 60,000 cps | 38cm² | 5cm² |

The above data illustrates that the more severe shearing will substantially reduce the ultimate imitation cheese melt values. The melt value of any given imitation cheese product containing an effective soy isolate may be regulated by controlling the amount of shear applied to the recipe preparation.

The dry isolate products prepared in accordance with this invention are highly soluble and therefore tend to form a protective hydrated isolate layer on the external portion of the particles when dispersed in water. This balling or doughing effect prevents complete dissolution of the isolate into water. Accordingly the NSI values for the dry isolate herein were determined by employing the following techniques of placing the isolate into solution for nitrogen analysis.

NITROGEN SOLUBILITY INDEX (NSI)

(Shaker Bath Method)

APPARATUS

1. Blender cup, semimicro, (American Scientific Products, No. S8395-1-Container)
2. Blender, single speed Waring 700 (American Scientific Products, No. S-8346-5-Blendor).
3. Variable transformer, 0-140 V (Fisher Scientific No. 9-521-110).
4. Centrifuge, clinical (International Equipment Corp., Model CL, or equivalent).

5. Shaker bath (Precision Scientific Co., Model 25).

PROCEDURE

1. Pipette exactly 50.0 ml. deionized water into the blender cup.
2. Weigh (to nearest 0.1 mg) 5 g±0.01 g sample onto a tared N-free weighing paper.
3. Start blender (pre-set to 8500 rpm) and rapidly (2 sec.) spinkle sample into the water vortex.
4. Continue blending for exactly 10 seconds after completion of sample addition.
5. Reweigh sample paper and correct the sample weight for sample remaining on the paper.
6. Add 2 drops of octyl alcohol defoamer to the cup and mix contents by swirling (2 sec.).
7. Allow foam to collapse (10–15 seconds), then pour contents of cup through a glass funnel into a 4 oz. glass bottle (screw cap). Allow blender cup to drain 30 seconds.
8. Cap bottle and place in shaker bath equilibrated to 30°±0.5° C.
9. Adjust shaker to 120 oscillations/minute and allow bottle to shake for 120 minutes.
10. Take out bottle and immediately decant about 40 ml. into a 50 ml. centrifuge tube.
11. Centrifuge for exactly 15 minutes at 2650 rpm (Clinical centrifuge, setting B).
12. Allow centrifuge to come to rest slowly so as to not disturb the protein sediment.
13. Decant supernatant through fluted paper (Eaton-Dikeman #513, 12.5 cm).
14. Transfer exactly 20.0 ml filtrate into 800 ml Kjeldahl flask and analyze for nitrogen.
15. Analyze original sample for total nitrogen.

With reference to Examples 1 and 2, about 30–50% by weight of the total seed protein will typically remain in the seed material as insoluble protein with the balance being extracted therefrom. About 4% to about 8% of the total seed protein content constitutes whey proteins and will typically not be recovered as part of the dry isolate product. In a single stage extraction a 10:1 and 14.5 water to soy grit weight ratio will respectively yield about 50% and 55% recovery of the total seed protein. A countercurrent extraction conducted at a 10:1 water to soy grit ratio can effectively extract at least about 60% of the total seed protein with more than 55% being recovered as isolate product with the remainder being unrecoverable whey protein.

We claim:

1. In a meltable imitation cheese product comprised of milk protein, fatty triglycerides, water, coloring agents, flavoring agents and other conventional imitation cheese additives, the improvement which comprises replacing at least 20% by weight of the milk protein with a vegetable protein isolate characterized as: (a) having an NSI of at least 90, (b) forming an isolate gel when heated to 85° C. for 30 minutes at a 15% by weight concentration in water, (c) substantially free from vegetable hydrolyzates and (d) having a melt value of at least 15 cm².

2. The imitation cheese product according to claim 1 wherein at least ⅓ of the total caseinate weight of said imitation cheese product is replaced with a soy isolate having a melt value of at least 25 cm².

3. The cheese product according to claim 2 wherein the soy isolate comprises a dry isolate having an NSI of at least 95 and a melt value of at least 30 cm².

4. In a method for preparing an meltable imitation cheese product wherein a fluid homogeneous admixture comprised of water, milk protein, triglyceride fat and other conventional imitation cheese product additives is prepared and the fluid admixture is cooled to solidify the homogeneous admixture into an imitation cheese product, the improvement which comprises replacing at least 25% by weight of the caseinate in said admixture with a vegetable protein isolate characterized as: (a) having an NSI of at least 90, (b) forming an isoluble gel when heated to 85° C. for 30 minutes at 15% by weight concentration in water, (c) substantially free from vegetable protein hydrolyzates and (d) having a melt value of at least 15 cm².

5. The method according to claim 4 wherein from about 40% to about 60% by weight of said caseinate is replaced with a soy isolate characterized as having a melt value of at least 30 cm².

6. The method according to claim 4 wherein the vegetable isolate consists essentially of a soy protein wherein substantially all of the aqueous soluble constituents have been extracted from said soy protein to provide a bland soy isolate.

7. The method according to claim 5 wherein the weight percent of protein aggregates (on a buffered-salt-extractable basis) of a molecular weight of at least $1 \times 10^6$ M.W. constitutes the major weight percent of said protein isolate and the weight percent of at least $1 \times 10^6$ M.W. protein aggregates exceeds the less than $2 \times 10^5$ M.W. fraction weight percent by at least threefold.

8. The method according to claim 5 wherein the soy isolate is prepared by a method comprising the steps of: (a) extracting water-soluble protein constituents from a defatted vegetable protein material slurry at a pH between 6.5 and 8.0 and a temperature of less than 50° C., (b) recovering at least a major weight portion of the extracted water-soluble protein constituents from the aqueous slurry; (c) dissolving the recovered protein constituents in water to form an aqueous solution thereof; (d) heating the aqueous solution to a temperature of at least 60° C. at a pH from 6.8 to 7.5 for a period of time sufficient to impart a melt value of at least 15 cm² to the dissolved protein constituents in said aqueous solution, and (e) recovering the heated soy protein constituents.

9. The method according to claim 4 wherein the soy isolate is prepared by a method comprising the steps of: (a) extracting water-soluble protein constituents from a slurry of defatted vegetable protein material at a pH between 6.5 and 8.0 and a temperature of less than 50° C., (b) recovering at least a major weight portion of the extracted water-soluble protein constituents from the aqueous slurry, (c) dissolving the recovered protein constituents in water to form an aqueous solution thereof, (d) heating the aqueous solution to a temperature of at least 60° C. at a pH from 6.8 to 7.5 for a period of time sufficient to impart a melt value of at least 15 cm² to the dissolved protein constituents in said aqueous solution, and (e) recovering the heated protein constituents from said aqueous solution by spray-drying.

* * * * *

UNITED STATES PATENT AND TRADEMARK OFFICE
CERTIFICATE OF CORRECTION

PATENT NO. : 4,349,576
DATED : September 14, 1982
INVENTOR(S) : William F. Lehnhardt et al.

It is certified that error appears in the above-identified patent and that said Letters Patent are hereby corrected as shown below:

Column 1, line 9, for "most" read ---more---

Column 1, line 56, for "As" read ---An---

Column 11, line 68, for "mild" read ---milk---

Column 16, bridging lines 47-48 for "operates" read ---operated---

Column 19, claim 1, line 60, for "vegetable hydrolyzate" read
    ---vegetable protein hydrolyzate---

Column 20, claim 6, line 24, for "aqueous soluble" read ---aqueous
    alcohol soluble"

Signed and Sealed this

Thirteenth Day of December 1983

[SEAL]

Attest:

GERALD J. MOSSINGHOFF

Attesting Officer

Commissioner of Patents and Trademarks